(12) United States Patent
Henze et al.

(10) Patent No.: US 10,373,082 B2
(45) Date of Patent: Aug. 6, 2019

(54) INTEGRATION OF COMMERCIAL BUILDING OPERATIONS WITH ELECTRIC SYSTEM OPERATIONS AND MARKETS

(75) Inventors: Gregor P. Henze, Boulder, CO (US); Vincent J. Cushing, Chicago, IL (US); Charles D. Corbin, Boulder, CO (US); Sandro Plamp, Chicago, IL (US)

(73) Assignees: QCoefficient, Inc., Chicago, IL (US); The Regents of the University of Colorado, Denver, CO (US)

( * ) Notice: Subject to any disclaimer, the term of this patent is extended or adjusted under 35 U.S.C. 154(b) by 1776 days.

(21) Appl. No.: 13/404,748

(22) Filed: Feb. 24, 2012

(65) Prior Publication Data
US 2013/0013121 A1    Jan. 10, 2013

Related U.S. Application Data

(60) Provisional application No. 61/446,233, filed on Feb. 24, 2011, provisional application No. 61/514,477, (Continued)

(51) Int. Cl.
*G06Q 10/04* (2012.01)
*G06Q 10/06* (2012.01)
*G06Q 50/06* (2012.01)

(52) U.S. Cl.
CPC .............. *G06Q 10/04* (2013.01); *G06Q 10/06* (2013.01); *G06Q 50/06* (2013.01); *Y02P 90/84* (2015.11)

(58) Field of Classification Search
CPC ........ G06Q 10/04; G06Q 50/06; G06Q 10/06; H02J 3/14; Y02B 70/3225; Y04S 20/222
(Continued)

(56) References Cited

U.S. PATENT DOCUMENTS 6,757,591 B2 * 6/2004 Kramer .................... H02J 3/00
                                                          700/288
6,785,592 B1 * 8/2004 Smith .................... G06Q 50/06
                                                          700/291
(Continued)

FOREIGN PATENT DOCUMENTS

EP          1 134 508 A2     9/2001

OTHER PUBLICATIONS

U.S. Appl. No. 13/405,153, filed Feb. 24, 2012, Cushing et al.
(Continued)

*Primary Examiner* — Ronald D Hartman, Jr.
(74) *Attorney, Agent, or Firm* — Sughrue Mion, PLLC

(57) ABSTRACT

Buildings or facilities containing energy consuming or energy generating devices may be optimized for efficient energy usage and distribution. Energy consumption or generation by a building or components may be controlled by a system comprising a building model for predicting behavior of the building given predicted future conditions and possible control inputs. An optimization component running an optimization algorithm in conjunction with the building model may evaluate the predicted building behavior in accordance with at least one criterion and determine a desired set of control inputs. Commercial building thermal mass may be harnessed to continuously and optimally integrate large commercial building HVAC operations with electric grid operations and markets in large metropolitan areas. The service may be deployed using scalable, automated, web-based technology.

55 Claims, 10 Drawing Sheets

Wholesale hourly electric price [¢/kWh] for Chicago for June 16, 2008.

Related U.S. Application Data filed on Aug. 3, 2011, provisional application No. 61/446,243, filed on Feb. 24, 2011.

(58) Field of Classification Search
USPC .................................... 700/286, 291, 295
See application file for complete search history.

(56) References Cited

U.S. PATENT DOCUMENTS

| | | | |
|---|---|---|---|
| 7,062,361 B1* | 6/2006 | Lane ................. | F25D 29/00 700/291 |
| 7,444,189 B1* | 10/2008 | Marhoefer .......... | H01M 8/0612 700/26 |
| 7,565,227 B2* | 7/2009 | Richard ........... | G06Q 10/06312 700/286 |
| 8,019,445 B2* | 9/2011 | Marhoefer .......... | H01M 8/0612 700/26 |
| 8,086,352 B1* | 12/2011 | Elliott ................. | G05B 15/02 700/277 |
| 8,260,471 B2* | 9/2012 | Storch ................. | G06Q 10/06 307/132 E |
| 8,793,029 B2* | 7/2014 | Fausak ............... | G01D 4/002 700/276 |
| 8,880,226 B2* | 11/2014 | Raman ................ | G05B 13/026 700/277 |
| 8,977,405 B2* | 3/2015 | Shiel .................. | G06Q 50/06 700/286 |
| 9,002,532 B2* | 4/2015 | Asmus ............... | G05D 23/1917 236/1 B |
| 2008/0177423 A1* | 7/2008 | Brickfield .............. | H02J 3/008 700/291 |
| 2009/0048716 A1* | 2/2009 | Marhoefer .......... | H01M 8/0612 700/291 |
| 2009/0204267 A1* | 8/2009 | Sustaeta ............. | G05B 13/0285 700/291 |
| 2011/0022242 A1 | 1/2011 | Bukhin et al. | |
| 2011/0130886 A1* | 6/2011 | Drees ................. | G05B 15/02 700/291 |
| 2011/0231320 A1* | 9/2011 | Irving ................. | G06Q 30/00 705/80 |
| 2012/0046796 A1* | 2/2012 | Zhang ................ | G06Q 10/00 700/291 |
| 2012/0316687 A1* | 12/2012 | Chen ................. | H02J 3/008 700/276 |
| 2012/0323382 A1* | 12/2012 | Kamel ................ | G05F 1/66 700/286 |
| 2013/0013121 A1* | 1/2013 | Henze ................ | G06Q 10/04 700/291 |
| 2013/0190940 A1* | 7/2013 | Sloop ................. | G05B 15/02 700/291 |
| 2013/0231792 A1* | 9/2013 | Ji ....................... | G05B 19/02 700/291 |
| 2015/0057820 A1* | 2/2015 | Kefayati ............. | G06Q 50/06 700/291 |

OTHER PUBLICATIONS

PCT Search Report and Written Opinion, PCT/US2012/026615, Filed Feb. 24, 2012, dated Jun. 20, 2012.

Frauke Oldewurtel et al.: "Increasing Energy Efficiency in Building Climate Control Using Weather Forecasts and Model Predictive Control", Oct. 9, 2010 (Oct. 9, 1010_, XP55029351, Retrieved from the Internet: URL:http://www.eeh.ee.ethz.ch/uploads/tx_ethpublications/adewurtel_may10.pdf [retrieved on Jun. 8, 2012].

Vanessa Stauch et al.: "Weather forecasts, observations and algorithms for building simuation and predictive control", Jul. 30, 2010 (Jul. 30, 2010), XP55029356, Retrieved from the Internet: URL:http://www.opticontrol.ethz.ch/Lit/Stau_10_Rep-MeteoSwiss3rdYrContrib-ptiCtrl.pdf [retrieved on Jun. 8, 2012] Chapters 1 and 2.

Yudong Ma et al.: "Model predictive control for the operation of building cooling systems", American Control Conference (ACC), 2010, IEEE, Piscataway, NJ, USA, Jun. 30, 2010 (Jun. 30, 2010), pp. 5106-5111, XP031718925, ISCN 978-1-4244-7426-4 abstract.

James E. Braun: "Reducing Energy Costs and Peak Electrical Demand Through Optimal Control of Building Thermal Storage". Jan. 1, 1990 (Jan. 1, 1990), XP55029353, Retrieved from the Internet: URL:http://www.smartgridinformatlon.info/pdf/1880_doc_1.pdf [retrieved on Jun. 8, 2012].

"When Weather Forecasts Control the Heating", unknown publication date.

* cited by examiner

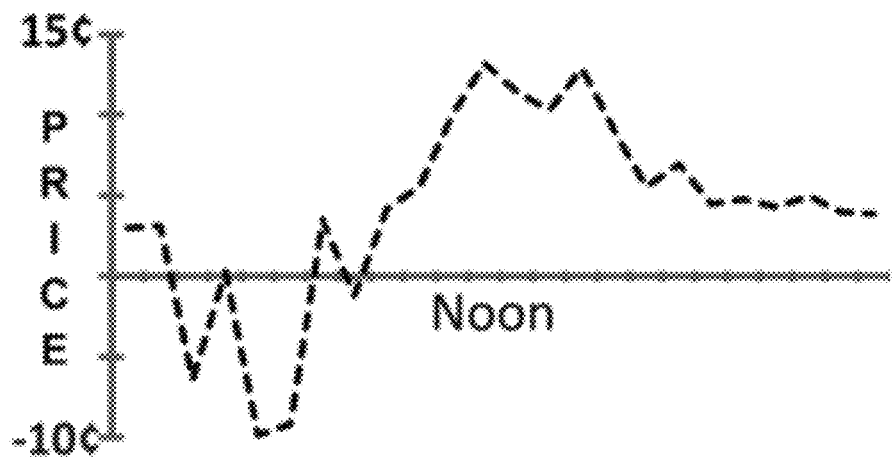
Figure 1: Wholesale hourly electric price [¢/kWh] for Chicago for June 16, 2008.
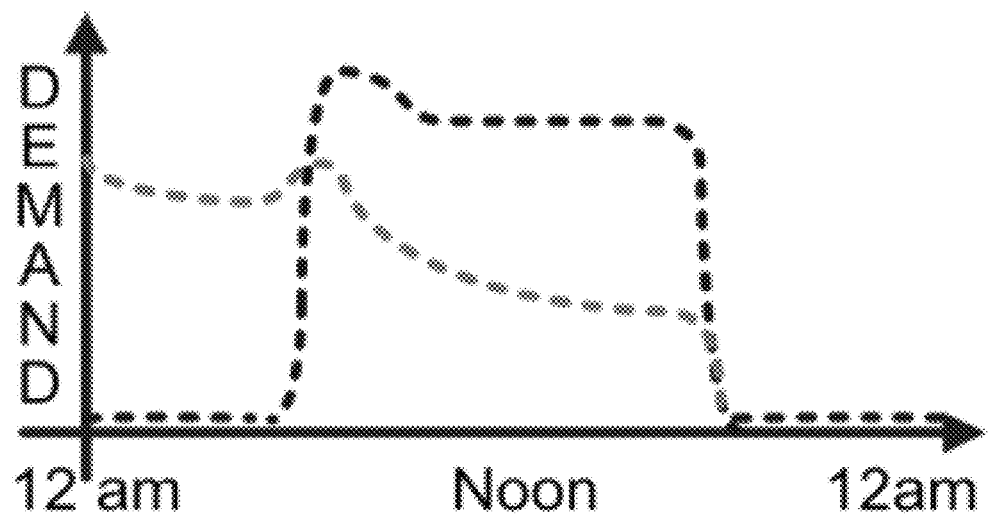
Figure 2: Demand profile in response to volatile price signal.

INTEGRATION OF COMMERCIAL BUILDING OPERATIONS WITH ELECTRIC SYSTEM OPERATIONS AND MARKETS

PRIORITY

This Application claims priority to U.S. Prov. App. No. 61/446,233, entitled "INTEGRATION OF COMMERCIAL BUILDING OPERATIONS WITH ELECTRIC SYSTEM OPERATIONS AND MARKETS", filed on Feb. 24, 2011; U.S. Prov. App. No. 61/514,477, entitled "INTEGRATION OF COMMERCIAL BUILDING OPERATIONS WITH ELECTRIC SYSTEM OPERATIONS AND MARKETS", filed on Aug. 3, 2011; and U.S. Prov. App. No. 61/446,243, entitled "USE OF DECISION ANALYSIS TO MAXIMIZE OPERATING MARGIN WHEN DEPLOYING AN AGGREGATION & INDUSTRIAL FACILITIES IN A WIDE ARRAY OF ELECTRIC AND GAS MARKETS", filed on Feb. 24, 2011; each of which are incorporated by reference. This Application is related to U.S. application Ser. No. 13/405,153, entitled "OPTIMIZATION OF ATTRIBUTES IN A PORTFOLIO OF COMMERCIAL AND INDUSTRIAL FACILITIES", filed on Feb. 24, 2012, the entire disclosure of which is incorporated by reference.

BACKGROUND

The disclosure relates to optimizing operation of buildings containing energy consuming or energy generating devices.

Energy usage is a critical issue going forward, with ever-growing pressure to reduce dependence on energy imports, to reduce carbon emissions and other pollutants, and of most immediate impact to most energy consumers, to reduce cost. From the standpoint of the energy supplier, e.g., a public utility, infrastructure costs are driven ever higher by increasing levels of peak demand and the need to supply that peak demand with generating capacity that sits idle for a large percentage of the time.

On the grid side of the electric meter, varying electrical demand dictates significant complexity and inefficiency in electric system investment, operations, and markets. For example:

Long development lead-times and long-lived assets means that the electric system was built for different energy policies and a different demand than it currently serves.

The daily variation of the electrical demand is substantial and inefficient—upward demand excursions require the investment in and dispatch inefficient peaking plants, while downward excursions at night impair the operation of efficient and environmentally sound baseload power plants. "Unit commitment" dictates that grid operators forecast all of this a day in advance.

Hourly and shorter variation of electrical demand is also substantial and inefficient—requiring a complex array of generating technologies and ancillary service markets to perfectly balance demand and supply in the electrical grid at any time.

Conventional demand response technology is only deployed to avert conditions of grid stress—curtailing customer demand during a relatively small number of days . . . and not focused on unlocking efficiency potentials on the supply side.

Going forward, the introduction of large quantities of intermittent renewable energy sources will exacerbate these grid operation challenges and the associated inefficiencies.

On the building side of the electric meter, optimization of large commercial building design and operations is increasingly sophisticated, with many competing companies and technologies providing significant value. However, such optimization stops at the meter. Its objective is to minimize end-use consumption and expense at the retail meter. Implicit in this thinking is that all kWhs are the same or, at best, differentiated broadly by on or off-peak prices. They are not. Instead, kWhs are produced season to season, day to day, and hour to hour from a wide range of generating resources; with different fuels, efficiencies, environmental emissions, and costs; and subject to varying states of grid congestion, especially in the urban core.

Also implicit in this thinking is that electricity is an hourly commodity. It is not. Instead, grid supply and demand is synchronized second to second by frequency response; minute to minute by regulation; and then by balancing markets that clear every five minutes. In addition, spinning reserves and inefficient combustion turbines are deployed for rapid load swings and generator forced outages.

As a result, especially in congested metropolitan areas, the retail meter boundary masks the significant complexity and inefficiency of electric system investment, operations, and markets—and so fosters only superficial commercial building contribution to grid economy, efficiency, reliability, and environmental performance.

Prior art solutions for optimizing building operations are limited in their ability to address these shortcomings in today's conditions.

It has been proposed to couple a building control and automation system with a software model of the building used to predict or simulate building energy use as a function of multiple possible building control signals, while an optimization algorithm operating in conjunction with the building model selects an optimum set of control signals to minimize energy use or expense at the meter, in an approach known as model predictive control (MPC). See, e.g., Henze, G. P., D. Kalz, S. Liu, and C. Felsmann (2005) "Experimental Analysis of Model-Based Predictive Optimal Control for Active and Passive Building Thermal Storage Inventory." HVAC&R Research, Vol. 11, No. 2, pp. 189-214. However, both the building model and optimization algorithm are limited, and as a result prior art MPC systems are limited in the number and size of buildings they can control, the number and type of building and environmental dynamics that can be controlled, and the number and type of objectives to be served.

In addition, utility supply has evolved to the point that there is an industry of "grid services" which can be exploited by suitable control of building operations. No building control system to date has properly exploited these grid services opportunities.

There is a need, then, for an energy consumption/generation optimization system that addresses these and other shortcomings.

BRIEF SUMMARY

Energy consumption and/or energy generation by a building or components thereof or devices therein are controlled by a system comprising a building model for predicting behavior of the building given predicted future conditions and possible control inputs, and an optimization component running an optimization algorithm in conjunction with the building model, for evaluating the predicted building behavior in accordance with at least one criterion, and to determine a desired set of control inputs. As used herein and in the appended claims, the "behavior" of a building over a period of time means changes in at least one physical state of the building during that period of time.

The system interacts with a building automation system for controlling various appliances within a building. The predicted future conditions taken into account by the building model may include weather and/or one or more grid conditions. The building model further considers possible control inputs such as thermostat temperature set points or ventilation controls. An optimization algorithm considers as inputs energy price, current building parameters such as temperatures in one or more zones and optionally other parameters reflecting building functions to be controlled, e.g., temperature, $CO_2$ concentration, chiller status, etc. and determines one or more control commands such as temperature set points. These set points are communicated to the building automation system, which in turn implements the control.

As necessary to capture the full value of large building/grid integration, the building model and optimization algorithm can take into account a variety of environmental dynamics (e.g., energy price, weather, grid events, and other dynamics which occur externally of the building), and/or a plurality of building dynamics which are characteristics of the building itself, e.g., thermal mass as a thermal energy battery, demand controlled ventilation affecting the $CO_2$ concentration to effectively implement a fresh air storage battery, chilled water battery, coupled optimization of building cooling load profile and associated building energy system operation, and others. The system of this disclosure reveals, maps, and harnesses such building dynamics to grid dynamics.

The disclosure presents core technologies and scalable methodologies for harnessing commercial building thermal mass to continuously and optimally integrate large commercial building HVAC operations with electric grid operations and markets in large metropolitan areas. The service is deployed using scalable, automated, web-based technology.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 1 is a graph showing the wholesale hourly electric price (in cents/kWh) for the city of Chicago on Jun. 16, 2008;

FIG. 2 is a graph showing an example of a demand profile implemented by the system of the present invention taking into account hourly prices represented in FIG. 1;

DETAILED DESCRIPTION

At a basic level, the system can manipulate a global temperature set point within adjustable limits, enabling building energy system operations to optimally respond to price signals (FIG. 1) to economically shift and shape a building HVAC demand profile (FIG. 2).

The system described herein presents a holistic solution to optimize the performance of the entire electricity system, from generation to consumption. All other approaches that focus separately on either the grid or customer sides of the meter are sub-optimal, leaving significant untapped opportunities for efficiency improvement.

More specifically, the system presents an automated, on-line, scalable technology that continuously integrates the HVAC operations of large commercial buildings with electric grid operations and markets in grid-congested metropolitan areas. A system practicing the invention can harness the thermal mass, or "flywheel" effect, of these buildings on several time scales—diurnal, hourly, and shorter.

For example, in presenting an automated, scalable, hourly optimization system that exploits the thermal mass embodied in the physical structure of commercial office buildings, the invention can efficiently shape cooling and heating loads and optimize building HVAC system operation in response to highly dynamic electric or carbon market prices.

Model Predictive Control—

The system resides in a model predictive control (MPC) system for controlling operations of buildings. In such a system, a model of the building is used to predict building behavior going forward, and these predictions are then used to decide now on a control strategy (i.e., a planned sequence of control over a period of time) best suited to obtaining a particular objective given predicted future conditions.

Figure 3:
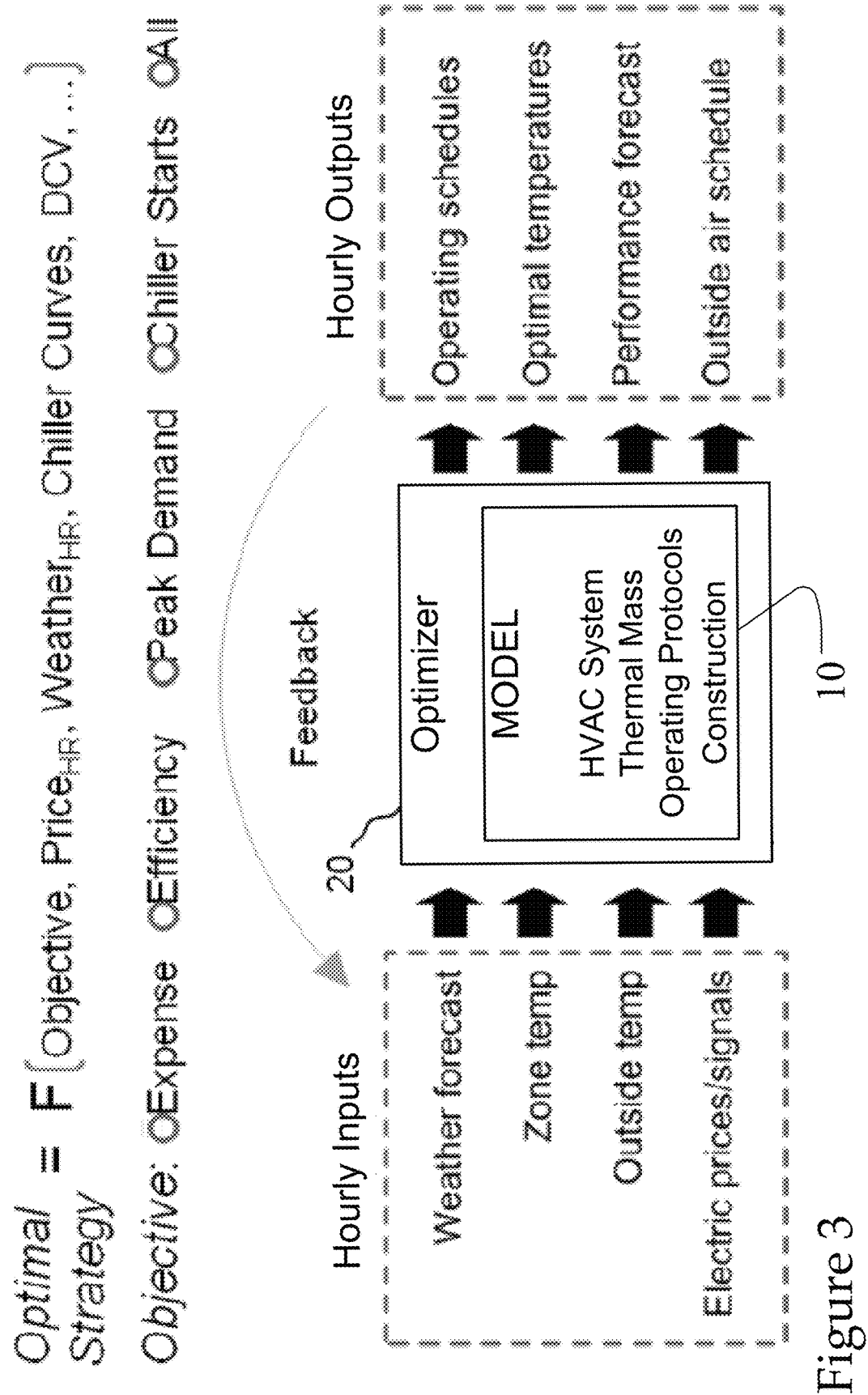
FIG. 3 is a functional diagram for explaining the operation of the optimization system of the present invention.

A simple block diagram of the most basic aspects of the MPC system is shown in FIG. 3. A software model 10 of a building simulates building behavior given a set of conditions including a) past building performance over a properly chosen recent past, b) predicted (but not controllable) conditions, e.g., weather and utility signals, and c) controllable conditions, e.g., temperature set points on one or more thermostats in the building or HVAC system set points. The output of the building model represents the predicted response of the building to those conditions. The information contained in the model output would, of course, depend on what aspects of the building the system operator wishes to impact, e.g., predicted actual temperatures in one or more zones within the building, predicted carbon dioxide concentration levels in one or more zones, etc. The building model outputs are provided to an optimizer 20 which explores a number of different possible control signal sets (where a set includes at least one control signal but may include multiple control signals) or temporal sequences of control signals to the building model, monitoring the predicted building response to the control signals and choosing which obtains the best result over a planning horizon, e.g., a 24-hour period. The optimizer may consider predicted conditions other than weather, which do not affect the building behavior but do impact the optimum building control strategy, e.g., predicted energy price fluctuations over the planning horizon. After evaluating a large number of options and choosing the best one, this optimized control signal set for the current control period, e.g., a control period of one hour over which the current control signal set will be maintained, is sent to the building automation system (not shown) of the modeled building to control one or more aspects of building operation. In a simple example, the optimized control signals comprise a set of temperature set points for various zones throughout the building. Optionally, the optimizer may send to the building automation system (BAS) an entire 24-hour (or longer) sequence of temperature set points (hereafter referred to as a control signal plan) so that the BAS can operate independently of the optimizer should there be a break in the system communications. In more full-featured systems, the control signals can include other than temperature set points, e.g., ventilation control signals.

Preferably, the optimizer determines a new 24-hour optimized control signal plan multiple times during a 24-hour period, e.g., once per hour, and sends either a new current control signal set or a new 24-hour control signal plan to the BAS. FIG. 3 shows hourly inputs to the system including weather forecast, zone temperatures, outside temperature and electricity prices, and optimizer outputs include operating schedules (e.g., for any part of a building where there is no ability to control the temperature set point, the system will control times of operation instead of temperature set point), optimal set point temperatures, performance forecast (e.g., a total energy expense or a comparison of the energy expense under the optimized control signal plan vs. the energy expense that would have resulted without optimization according to the present invention) and outside air (i.e., ventilation) schedule.

Figure 4:
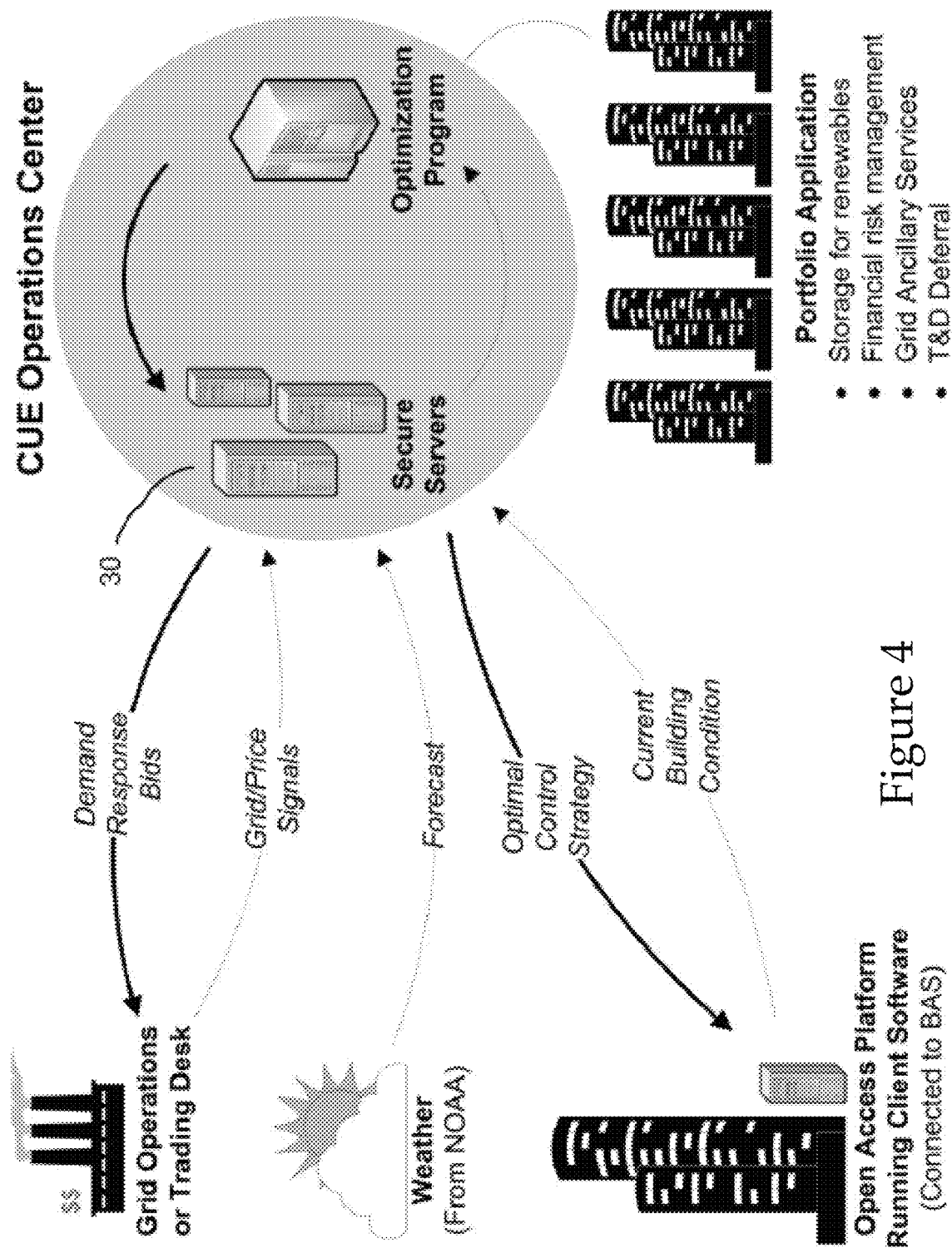
FIG. 4 is a system diagram of the building energy management optimization system according to the invention, showing the system of FIG. 3 in its working environment.

FIG. 4 illustrates a larger system in which the present invention can be employed, with the model 10 and optimizer 20 of FIG. 3 running on servers 30 to derive an optimal control strategy including temperature set points and optionally other control signals to be supplied to the client software located at the building being controlled, the client software interfacing the building BAS. From the grid, e.g., PJM in the Midwestern United States, the system receives pricing data, and after optimization returns to the grid signals indicating demand response participation, load data or other grid market participation signals. As described in more detail below, the inventive system may control a portfolio of multiple buildings, bringing the benefits of scale.

Figure 5:
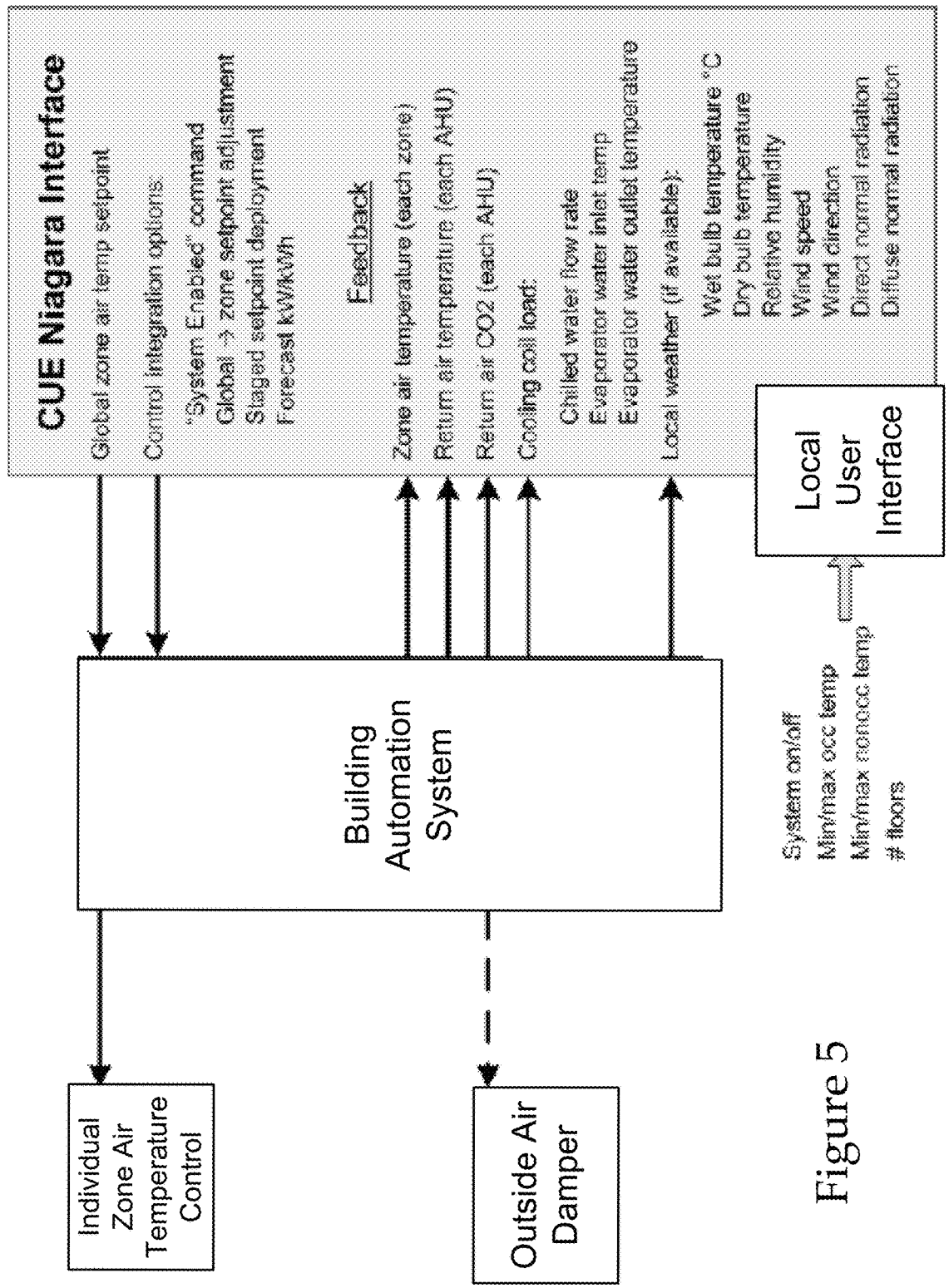
FIG. 5 illustrates the interface between the optimizer and building automation system (BAS) in the system of FIG. 4.

FIG. 5 illustrates the interface between the optimizer and building automation system (BAS). The interface can be implemented using publicly available software, e.g., from the Niagara Software Developer Group. The BAS provides feedback to the interface in the form of, for example, the zone air temperatures, return air temperatures and $CO_2$ levels for each Air Handling Unit (AHU), cooling coil loads and local weather data (note that the inventive system may control multiple buildings in widely disparate geographical locations, so data regarding local weather may be provided by the building itself). Also provided is a local user interface permitting the building operator to provide input such as, for example, turning the system on and off, designating desired minimum and maximum temperatures during occupied and non-occupied hours, and indicating the number of floors to be controlled.

The following example is for a building that wants to optimize its energy use for the next 24 hours for operating cost savings. The optimizer is asked what can be done to minimize operational costs over that planning horizon. To determine a solution, the optimizer then takes into account:

1. the thermal history of the building over some recent past period of time (with a trade-off between a longer time period for more accuracy and robustness, and a shorter time requiring less processing, less storage and a shorter time to develop, with a 7-21 day history being a suitable range for most instances),
2. current weather information and predicted weather conditions,
3. predicted energy prices,
4. the dynamic and possibly nonlinear character of both the building thermal mass (structural mass and interior furnishing) and its energy systems, and
5. any empirical or automated non-predictive HVAC optimization processes employed by the building (e.g., chiller and cooling tower sequencing schemes, supply air and chilled water reset, or variable speed drive coordination algorithms). For illustration purposes, assume weather data shows that the day will become warmer in the next hour on this summer afternoon; energy pricing information shows that the peak price will occur in the next hour. Then, the resulting optimized control decision may be to pre-cool the building while the energy prices and outdoor temperatures are relatively lower; in a manner that takes better advantage of existing non-predictive optimization processes and in a manner that more efficiently loads chiller equipment.

The optimization process can be generalized from a) HVAC operating cost minimization to b) improved electric generation efficiency and environmental performance through carbon emissions minimization and the inclusion of renewable energy sources, as well as c) the creation of large-scale demand elasticity when deployed in portfolios of commercial buildings.

Figure 6:
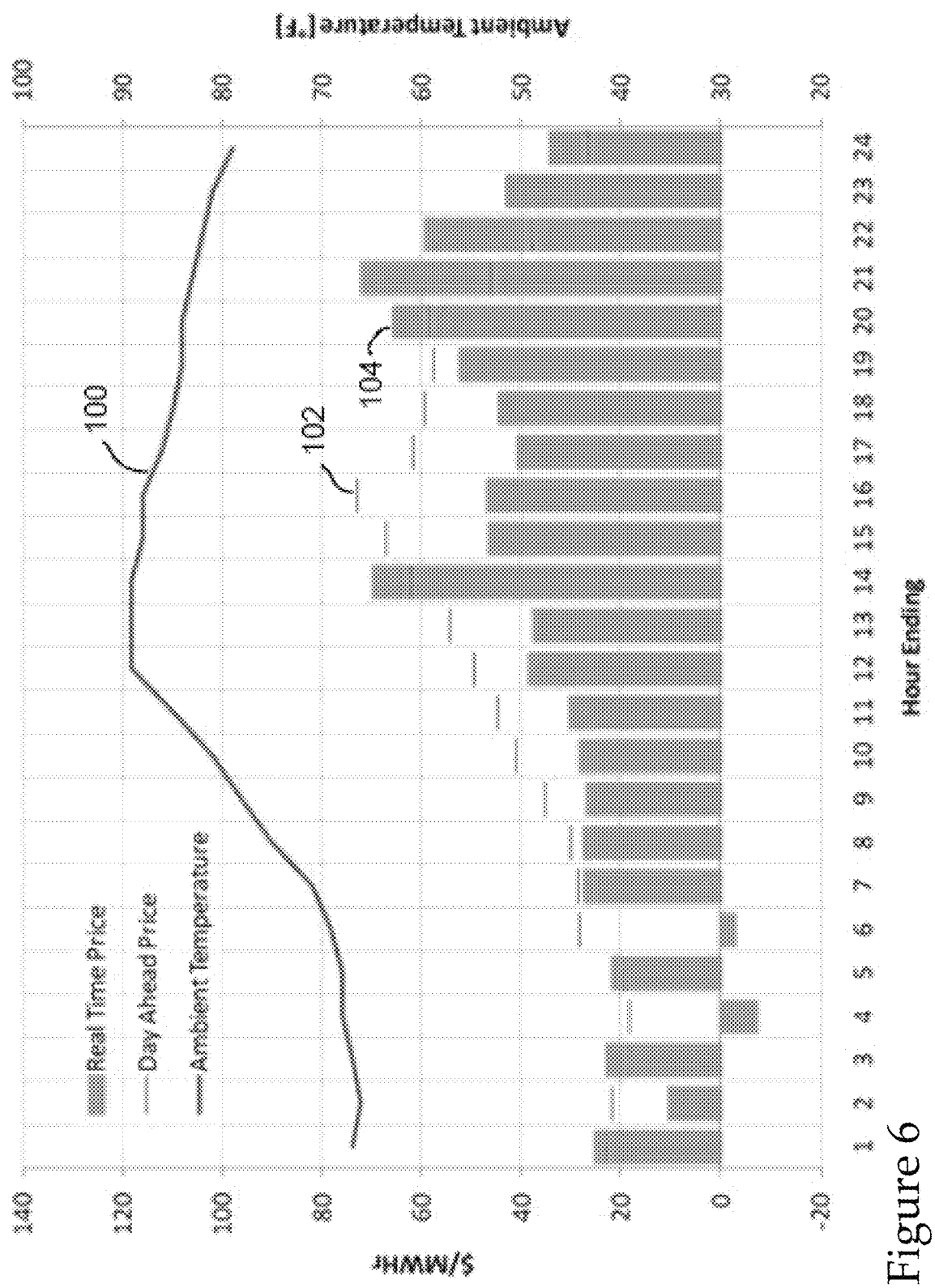
FIG. 6 is a graph for explaining typical fluctuations in energy price over the course of a summer day.
Figure 7:
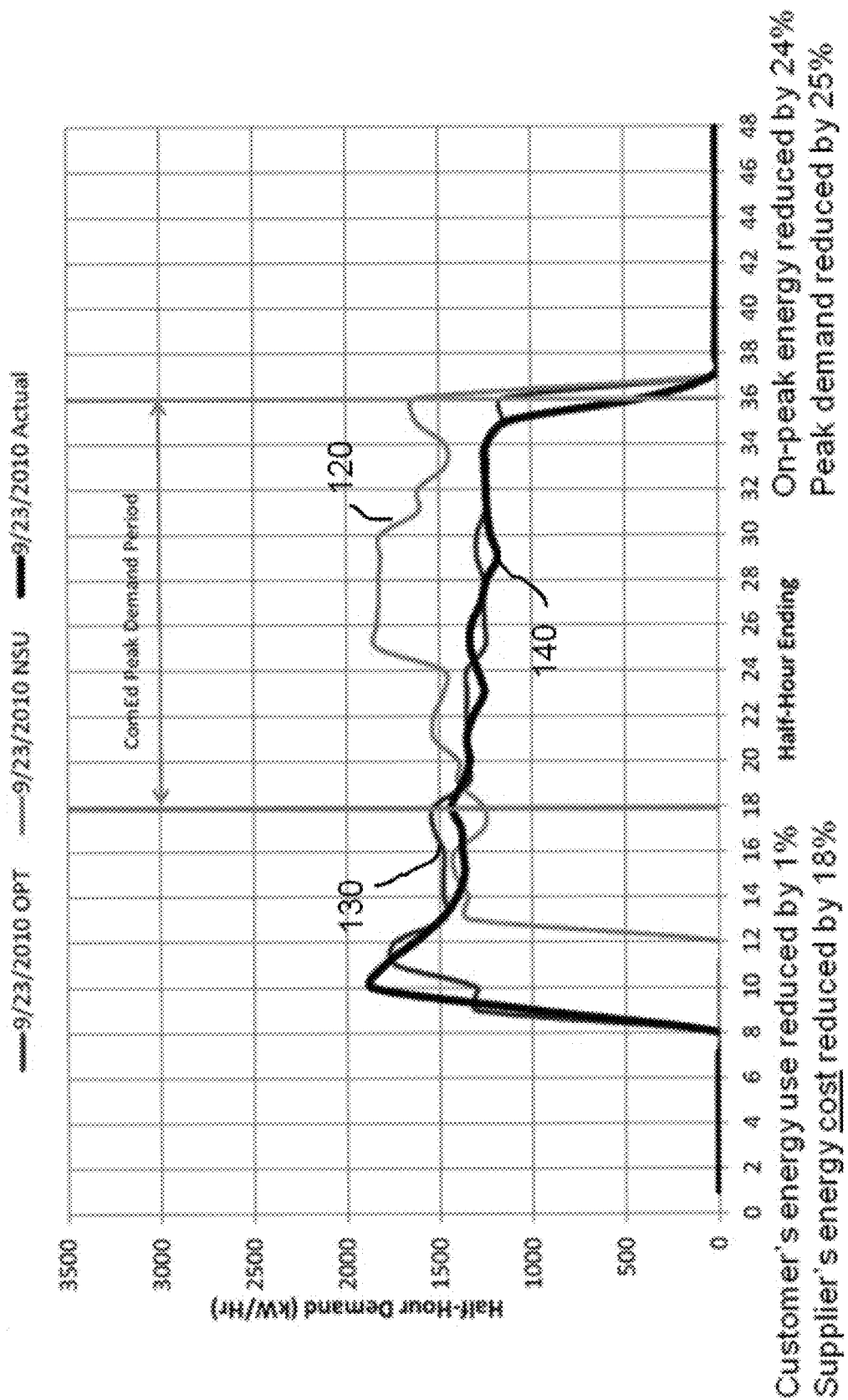
FIG. 7 illustrates conventional building control scenario compared to a building control scenario according to the invention optimized for energy expense.
Figure 8:
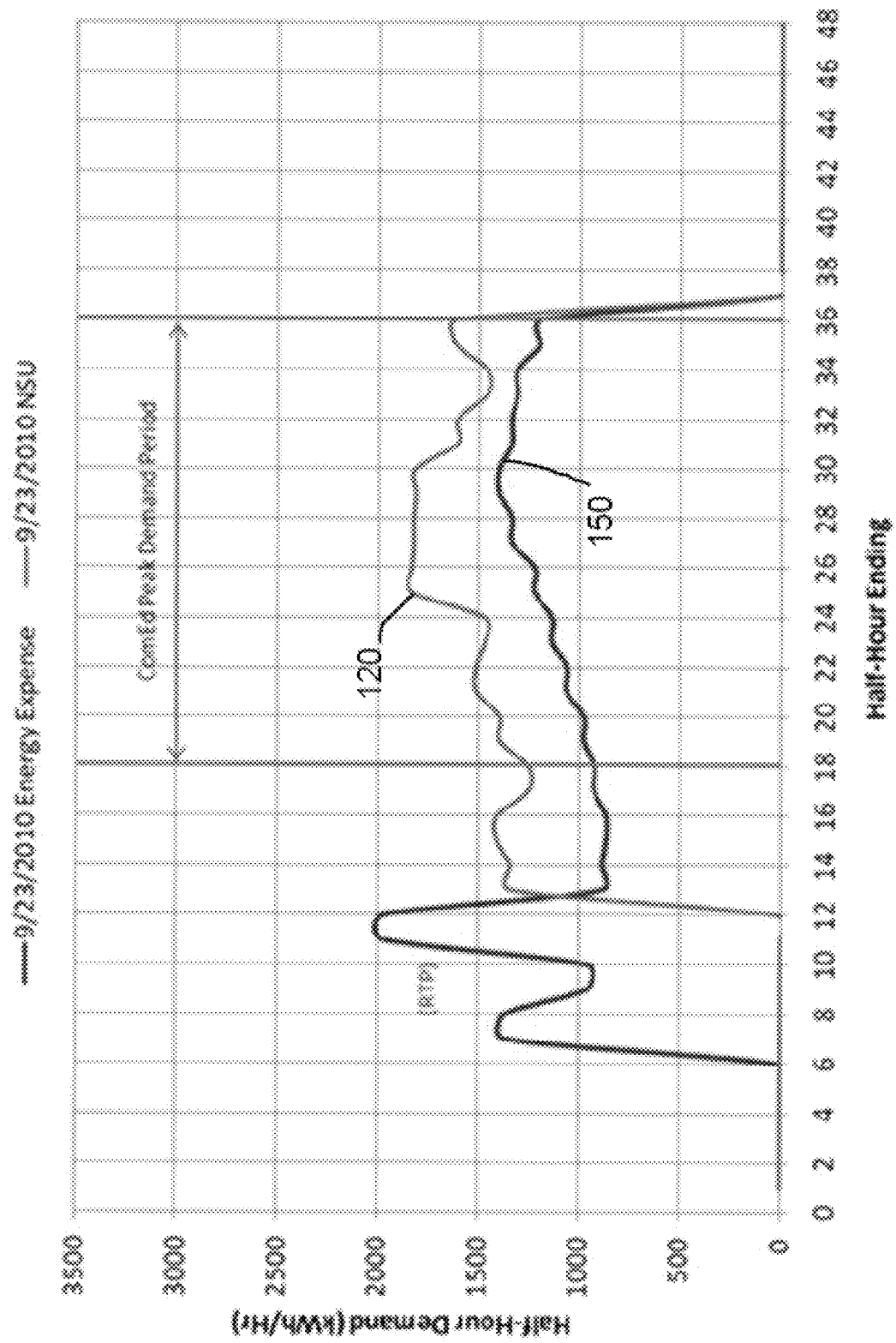
FIG. 8 illustrates conventional building control scenario compared to a building control scenario according to the invention optimized for grid services.

The effect of the invention can be better appreciated from the information presented in FIGS. 6-8. FIG. 6 illustrates typical fluctuations in energy price over the course of a summer day having an actual temperature profile shown at 100, with the hourly electricity price predicted a day ahead of time at 102, and the actual electricity price shown at 104. The actual and predicted prices track fairly well, if the temperature prediction is accurate.

FIG. 7 illustrates different building control scenarios, with the horizontal time scale representing a 24-hour control planning horizon divided into 48 half-hour segments. Curve 120 shows a conventional "Nighttime Set-Up" (NSU) building control scenario where the HVAC system comes on at about 6:00 a.m. to have the building comfortable by the time most of the work force arrives, and shuts down for the night at 6:00 p.m. Curve 130 shows an example of optimized control according to the present invention, with curve 140 showing the actual energy cost profile achieved by the control program 130. Note that the HVAC system comes on at about 4:00 a.m. to precool the building during low energy price hours. Note that the peak demand for the building now occurs at about 5:30 a.m., at a lower price and outside of the peak demand period for the supplier. The peak building demand during the 9:00 a.m. to 6:00 p.m. peak demand period for the provider is reduced by approximately 25%, and the total energy consumed during the peak demand period is reduced by approximately 24%. There is only a 1% reduction in customer energy use, but much of the energy use has been shifted to early morning hours, with the result that there is an 18% savings in energy cost, and corresponding savings in customer expense.

FIG. 8 shows the energy demand for the same building on the same day, with the same NSU control plan shown at 120. Curve 150 in FIG. 8 shows what could be achieved if the energy use were managed according to grid objectives. Note from FIG. 6 that the energy price drops precipitously between the hours of 3:00 a.m. and 4:00 a.m. and again between the hours of 6:00 a.m. and 7:00 a.m., so stronger pre-cooling would be performed during those times. The strongly pre-cooled building then lowers the building energy demand throughout the day, and savings to both the customer and the supplier are realized.

Multiple Environmental and Building Dynamics—

As necessary to capture the full value of large building/grid integration, the building model and optimization algorithm can take into account a variety of environmental dynamics (e.g., energy price, weather, grid events, and other dynamics which occur externally of the building), and/or a plurality of building dynamics which are characteristics of the building itself, e.g., the thermal mass behavior of the building. According to the invention, the thermal mass of the building can be managed as a thermal mass battery, "charging" the battery by setting lower temperature set points during relatively lower energy price periods, and "discharging" the battery by setting higher temperature set points during relatively higher energy price periods and allowing the thermal mass battery to provide some of the cooling demand. Other "batteries" which can be effectively operated are, for example:

A fresh air battery battery—occupant comfort and health requires fresh air, but outside air is (generally) warmer and of higher moisture content, increasing the load on the cooling system. The present invention may "charge" the fresh air battery using optimized demand controlled ventilation (DCV) by letting in enough outside air to drive the monitored $CO_2$ levels very low, i.e., over-ventilating, then "discharge" the fresh air battery by allowing less outside air during, e.g., higher energy expense periods (due to higher energy prices or higher cooling demands) or in response to some detected event (e.g., an unexpected rise in outside air temperature).

A chilled water battery—particularly in large buildings, the pipe(s) carrying chilled water to the air handling unit (AHU) may be large enough to warrant control as a separate "battery," e.g., charging the battery by overcooling the chilled water at some times and then allowing the chilled water temperature to rise (within acceptable bounds) at a later time to "discharge" the chilled water battery and conserve energy.

Another building dynamic the optimization system can take into account is the coupled optimization of building cooling load profile and associated building energy system operation.

The system of this invention reveals, maps, and harnesses all of these and possibly other such building dynamics to grid dynamics. For example, when the grid indicates an energy price spike, the invention may discharge all of its "batteries" to immediately reduce load and save costs. The system can charge the batteries in response to detected very favorable pricing conditions, or the system could charge the batteries to at least some degree during normal pricing conditions so that some "battery" state-of-charge is available to take advantage of opportunities that are statistically expected to occur.

Features that can be incorporated into the optimization algorithm include, by way of example and without limitation: demand control ventilation optimization; economizer pre-cooling strategies; arbitrage of volatile and time-varying electric prices; arbitrage of chiller efficiency curve and the significant efficiency improvement opportunity for thermal mass strategies; ability to consider multiple, simultaneous optimization objectives such as lowering peak demand, increasing energy efficiency, decreasing energy expense, minimizing chiller starts or at least not exceeding some permitted number of chiller starts in a defined period; economies possible at night from availability of multiple cooling towers to serve a single chiller; real-time feedback regarding state of building thermal mass; part vs whole building direct digital control (DDC), e.g., if only 30 floors in a 60-floor building are equipped with DDC thermostats, the remaining floors (which may or may not be contiguous) will be controlled with simply ON/OFF times, including optimum start times for pre-cooling the non-DDC floors.

It can also be the case that simultaneous start-up (shut-down) of all floors will cause an excessive pressure drop (increase) in the supply air duct to satisfy the suddenly increased (decreased) cooling load such that the rapid response of the powerful air handling units (AHU) will implode (explode) the walls of the AHU containment structure, so the system may implement AHU ramping to accommodate start-up. A similarly sudden increase (decrease) in the cooling load may occur if all set point temperatures in the building are changed suddenly, so the system may implement a control over how many and how rapidly the set points can be changed, e.g. a limit of 0.5 degree Fahrenheit set point change every ten minutes. It may also be undesirable to start or stop all chillers simultaneously in response to such a rapid cooling set point change, so chiller sequencing may be implemented, e.g., a time delay would be imposed after an initial chiller start/stop to allow the cooling load to reach the new equilibrium and thus assure that the number of chillers in operation is consistent with the steady-state, not the instantaneous cooling load.

Finally, it may be beneficial to adopt a policy switching protocol, i.e., a protocol that limits changes to the control plan sent to the BAS from the optimizer. For example, if a newly derived 24-hour control plan is projected to save only a very small expense relative to the current control plan, e.g., less than some minimum savings considered significant, and/or if the savings will only occur very late in the 24-hour period, the system may choose instead to make no change to the control plan.

The Model—

The predictive model could be generated simply as a "black box" model, analyzing inputs and outputs over some period of time and determining a correlation between the two using inverse modeling techniques. While such a modeling process is relatively straightforward, the resulting model is limited. Without knowledge of what is inside the building, deriving an accurate model capable of adapting to circumstances that did not occur during the data collection period is difficult. As a consequence, data collection over a long period is needed to build a robust model. In addition, an inverse model would not allow the efficiencies and other advantages derived from knowledge of internal building details, e.g., the efficiency curves of the specific chillers used, the chilled water battery, etc.

The present invention therefore prefers (but does not in all cases require) the use of a detailed building energy simulation model that is based on knowledge of the building physics and energy systems, e.g., material properties such as of insulation and windows, energy system characteristics such as number of chillers, chiller operating characteristics, cold water pipes that may impact temperature behavior and can be treated/operated as a chilled water battery, utilization features such as occupancy of the building at different times of day, etc. A model of this type can predict ab initio, i.e., without collecting a data history, yet the collection of data can be used to both refine and confirm the model. It has been found that a model of this type achieves superior results in combination with remaining aspects of the invention.

In making use of a detailed building energy simulation building model that will be customized to individual buildings, the modeling process may then require extensive information about each building. Accordingly, the invention also provides a mechanism for simplifying the building model generation. According to the invention, the predictive model may be generated from a building energy simulation program. One such program is EnergyPlus, building energy simulation program developed by the U.S. Department of Energy that runs energy simulations and is freely available to end users, e.g., from http://apps1.eere.energy.gov/buildings/energyplus/. EnergyPlus is a whole building energy simulation program that engineers, architects, and researchers use to model energy and water use in buildings. Modeling the performance of a building with EnergyPlus enables building professionals to optimize the building design to use less energy and water. EnergyPlus models heating, cooling, lighting, ventilation, other energy flows, and water use. EnergyPlus includes many simulation capabilities, such as time-steps less than an hour, modular systems and plant integrated with heat balance-based zone simulation, multi-zone air flow, thermal comfort, water use, natural ventilation, and photovoltaic systems.

Another building energy simulation program is DOE-2, which calculates the hourly energy use and energy cost of a commercial or residential building given information about the building's climate, construction, operation, utility rate schedule and heating, ventilating, and air-conditioning (HVAC) equipment.

EnergyPlus and DOE-2 are but two of a number of a number of different commercially available or custom-made full-featured building energy simulation programs, others including but not limited to Ecotect, ESP-r, HAP, IDA ICE, SPARK, TAS and TRNSYS. All of these programs are designed for use by architects and engineers in designing buildings, the programs allowing the designer to predict how a particular building design will behave from an energy consumption standpoint. A unique aspect of the present invention is that such building energy simulation programs can be used for real time control of building operations. A significant advantage of this is that EnergyPlus and other building model platforms are designed for universal applicability to buildings of various sizes, shapes, designs, so they can be used for detailed building energy simulation modeling of most buildings in a straightforward manner. In addition, since these building energy simulation programs operate with standard sets of inputs and outputs, it is possible to then design an optimizer to operate in conjunction with the modeling program in a flexible plug-and-play manner so that buildings can be modeled using different programs and all can be compatible with the optimizer without having to modify the I/O functions of the optimizer. As used hereinafter, the characteristic of an optimizer whereby it can be used in combination with multiple different building energy simulation programs without having to modify the I/O functions of the optimizer will be referred to as being "compatible" with the multiple energy simulation programs.

A building energy simulation program such as EnergyPlus traditionally requires design day accuracy, and need not perform its analysis with the speed required for effective real time control of building operations, so one aspect of the present invention is to adapt a building energy simulation program to real time building control, an environment that requires speed, scalability, hourly accuracy, part-load accuracy, etc. This is accomplished in part through modeling protocols, in part through the optimization algorithm, in part through distributed processing.

A drawback of a building energy simulation program such as EnergyPlus is that the complexity of the program and the resulting models can lead to long turn-around times in developing models for particular buildings. But this can be addressed by developing a progression of models, e.g., a first model of less complexity by decreasing the number of zones into which the building is divided, the number of controllable devices, or by building modular models wherein a particular module modeling a particular aspect or part of the building can be at first approximated as a thermal network or other reduced order model, and achieving some degree of functionality in a short time, and then refining those part of the model with further work going forward.

Modeling Considerations—

It is also beneficial to keep in mind model attributes that, while not all necessary to practice the invention, may be beneficial, e.g.:

Accurate representation of cooling tower operation and economizer operation, especially under lightly loaded nighttime conditions.

Identification of critical HVAC system components & operations data

Accurate chiller efficiency curve through on-site measurement and calibration.

Accurate thermal mass representation (charge rate, discharge rate, storage time horizon, etc. using auto-calibration).

Accurate light/plug load pattern and magnitude (including feedback on unscheduled overtime hours)—drives the building thermal load and is important to thermal history.

Solar radiation forecast—also drives the building thermal load and is important to thermal history.

Mapping a global set point to wide range of local set points established over time by a building engineer—in response to cold/hot calls or to adapt to faulty temperature sensors.

Emphasis on "part load" HVAC modeling/calibration, in contrast to design day HVAC load modeling/calibration, more typical of detailed building energy simulation modeling that considers all 8,760 hours of the year. For example, HVAC operations in the swing seasons are typically less important to HVAC design studies because they are characterized by lightly loaded chillers and minimal expense. However, swing season modeling/calibration is more important to this invention—because early morning precooling during the summer has similar characteristic.

Building energy simulation modeling program developers appropriately emphasize features focused on typical occupied periods not pre-occupancy hours. If such modeling programs are to be used in conjunction with this invention, it is beneficial to overcome such limitation, for example, by disabling or circumventing the EnergyPlus "night cycle manager", etc.

The Optimizer—

The optimization algorithm has been implemented in Matlab, a program commercially available from Mathworks. In accordance with one aspect of the invention, the optimization algorithm is multi-dimensional, either in simultaneously optimizing in accordance with multiple objectives, or in optimizing in accordance with a primary objective but constraining that optimization in accordance with one or more secondary objectives. Various objectives would include, without limitation, expense minimization, peak demand reduction, energy efficiency (meter, source), occupant comfort assurance, carbon reduction, chiller start minimization, reliability/dependability (when providing grid services), operating reserves, frequency regulation, spinning reserve. The optimizer can also take into account a variety of input data in addition to predicted price and weather (and other parameters mentioned elsewhere herein), e.g., actual 5-min prices, imbalance energy, chilled water loop banking, thermal inertia, chiller and AHU sequencing, control variable rate change limitation to avoid too rapid AHU movement, AHU staging algorithm, etc.

Figure 9:
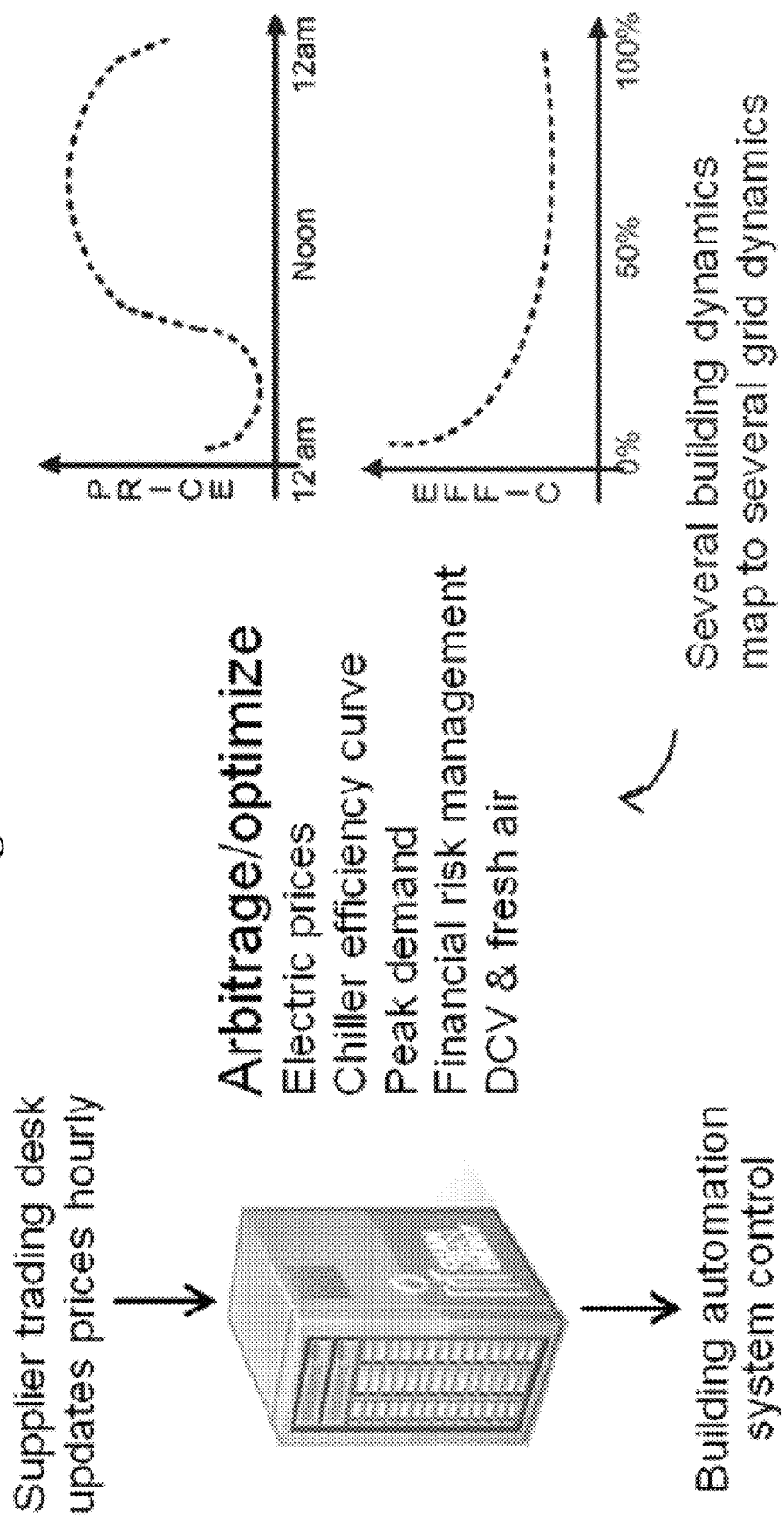
FIG. 9 is a functional illustration of an optimization system according to the invention which considers electric pricing and chiller efficiency curve information while optimizing peak demand, financial risk management and demand controlled ventilation (DCV) and fresh air.

FIG. 9 is a functional illustration of the optimization system according to the invention which considers electric pricing and HVAC part-load efficiency information while optimizing around dynamic electricity prices and achieving peak demand, financial risk management, and demand controlled ventilation (DCV);

The invention can utilize variable frequency drive (VFD) controlled devices as responsive loads to permit more rapid response commensurate with grid markets, and (particularly when a portfolio of multiple buildings are controlled together) can effective achieve grid scale energy storage. This leads to significant grid and ISO integration.

Figure 10:
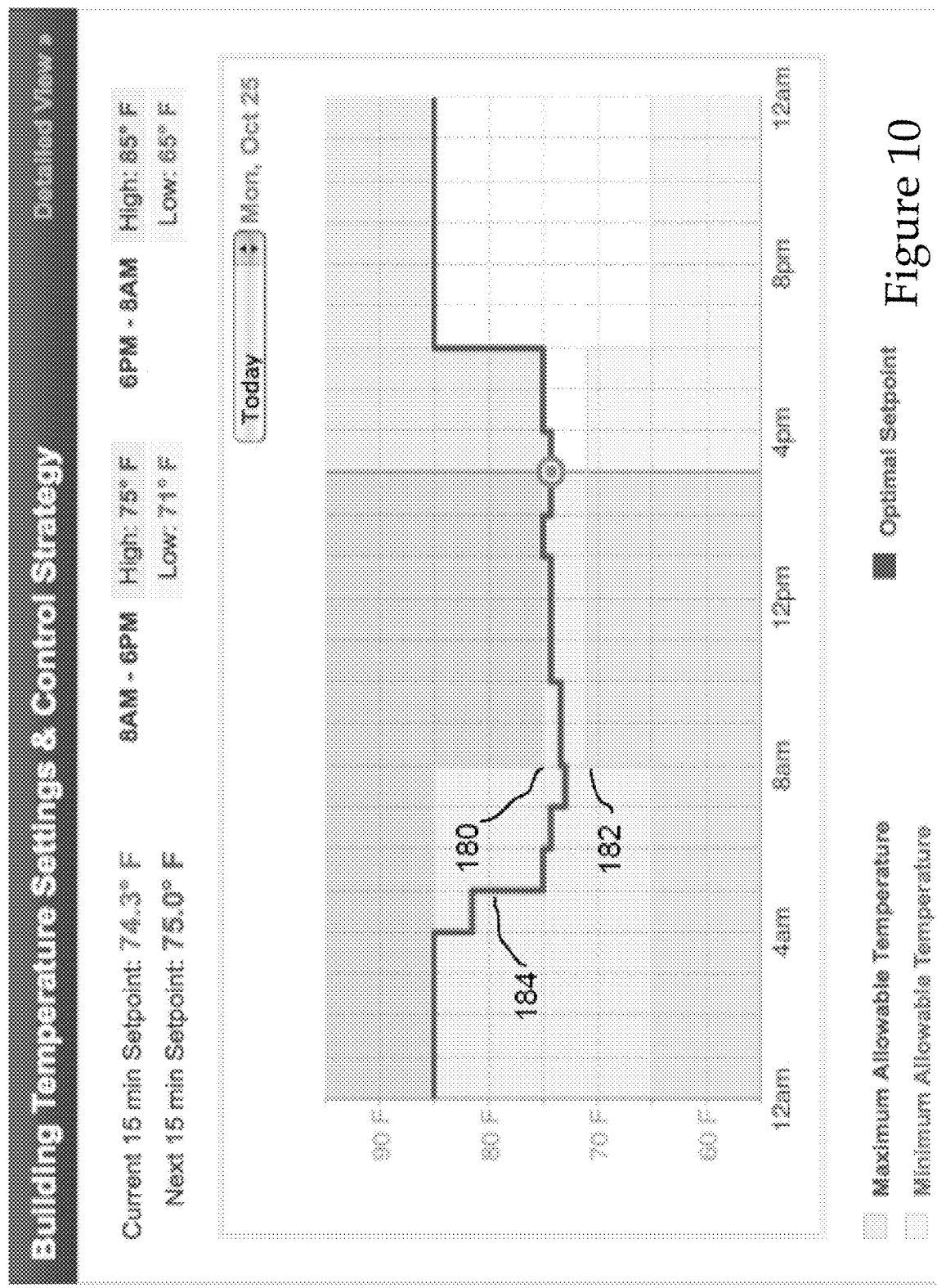
FIG. 10 is an illustration of a building control strategy implemented by a system according to the present invention.

As a simple example of multiple objectives, the optimization algorithm could consider energy expense the only primary objective but could constrain the optimization by imposing one or more constraints, e.g., there cannot be too many chiller starts in some period of time, or there must be some minimum customer comfort score maintained (a customer comfort score could simply be a temperature that cannot be exceeded). Or comfort could be determined as a combination of air temperature, mean radiant temperature, humidity, air velocity, occupant clothing level and metabolic rate as a function of activity in comfort model known as PMV/PPD developed by O. Fanger in 1971. In a simpler example, the optimization algorithm is simply constrained so that the temperature must remain within certain bounds, e.g., as shown in FIG. 10 where the boundary 180 represents the maximum building (or building zone) temperature permitted at various times during a 24-hour day, the boundary 182 designates minimum permissible building (or building zone) temperature during the same period, and 184 designates a temperature set point control plan over the planning period.

Alternatively, the optimization algorithm could simultaneously optimize energy expense and one or more additional objectives such as peak demand reduction, energy consumption/efficiency, chiller start minimization, customer comfort, carbon emissions, etc., and determine a set of control inputs that strikes the best balance among the various objectives, optionally assigning different weights to each of the objectives.

As used herein, the term "to optimize" means to obtain the theoretically best value, subject to possible constraints. For example, energy expense could be optimized, subject to the constraint that the temperature in any zone (or a particular zone) should not rise above a certain threshold value, or subject to not exceeding some maximum number of chiller starts. Simultaneously optimizing two objectives would mean that jointly optimal values for each are sought. For example, instead of using the maximum number of chiller starts as a constraint while optimizing only energy expense, one could seek to minimize energy expense while also seeking to minimize chiller starts. In the event that an optimum value of one could only be obtained via a selected control plan that yields a sub-optimum value of the other, the conflict could be resolved in different ways. One would be to simply treat one objective as being paramount, so that the second and subsequent objectives are optimized subject to the constraint that a sub-optimum value for the first objective is not permitted. For example, among several optimal solutions which achieve the same (or practically the same, e.g., by rounding the energy expense to some desired significant number of digits) energy expense, one could adopt the solution with the lowest energy use.

Another way of reconciling the conflict in simultaneously optimizing multiple objectives would be to assign a weight to each objective and then strike the best balance possible. In a preferred embodiment, all of the objectives to be optimized other than energy expense are assigned monetary "cost penalties" for exceeding certain limits, and the optimization algorithm can simply optimize total expense. (By optimizing total expense/cost, it is optimizing multiple objectives since the cost penalties are assigned for purposes of weighting objectives rather than as a reflection of true cost or expense, and would be simultaneously optimizing multiple objectives in the context of the claims hereafter.) In the same example as above, energy use could instead be assigned a cost penalty so that that the optimizer achieves an appropriate balance between minimal energy expense and minimal energy use.

Other conflict resolution techniques would also be possible.

The optimized control decisions are planned for an arbitrary planning horizon (typically the next 24 hours) but are re-calculated based on new information after every arbitrary execution time step (typically one hour). This process can be scaled to any number of buildings to allow concurrent optimization of building portfolios.

EnergyPlus and other building energy simulation programs are typically designed for building design, and can be quite slow in the context of real time control of building operations. Eliminating unnecessary EnergyPlus simulations can be of significant help. Examples of steps that can be taken to make the optimization process fast enough for real time MPC include:

Some optimization algorithms have a random component, and might evaluate the same set of control decisions over and over again. Thus, the optimization algorithm imposes a 'taboo list' to prevent the re-evaluation of previously simulated decisions.

The optimization process may run ten simulations in parallel looking for an optimal control decision. If one thread stops varying with time, it can be removed from the process so as to not waste computing resources.

A preferred optimization process uses particle swarm optimization, and this can be designed to operate using two or more neighborhoods of particles in parallel to increase the chances of finding a globally optimal control decision, as opposed to a locally optimal decision.

In addition to the above, it is possible to decrease the number of control signals. More particularly, for each additional parameter control signal included in a control signal plan, the number of possible control signal permutations which must be considered by the optimization algorithm increases exponentially. An additional control signal to be considered can result either from extending the planning horizon, e.g., a planning horizon covering the next 48 hours will, all other things being equal, require twice as many control signal sets as a plan covering only 24 hours. Additional control signals can also result from increasing the number of control signals in the planning horizon, i.e., decreasing the control period for which each set of control signals is to be maintained. For example, a control signal plan that covers 24 hours with a new control signal set each hour will require twice as many control signals compared to a 24-hour control signal plan where each control signal set is maintained for two hours or where the number of control signal sets is otherwise limited to twelve in the 24-hour period.

According to a preferred embodiment of the invention, it is desired to update the control signal plan once per hour, with the control signal plan covering a 24-hour period. But to decrease the number of control signals without significant loss of effectiveness, the 24-hour period can be divided into fewer than 24 control periods. This is accomplished by blocking hours together for which individual optimizations are not necessary. A characteristic of this aspect of the invention, referred to as "mode blocking," is that the control periods need not all be of the same duration. For example, there may be a three hour period during the night when electricity prices are typically stable and other environmental conditions also do not change, so that three-hour period can be treated as one control period, whereas in the afternoon on a business day it may be advantageous to have control periods last only one hour each to take advantage of changing conditions. Mode blocking adapts for greater focus on i) more important hours, ii) volatile-priced hours, iii) hours valuable to the optimization objective, etc.

Dynamic mode blocking may also be employed, for example, to put more focus on nearest hours, to shrink the planning horizon (to a 12-hour look ahead instead of 24 hours), to distinguish most price-volatile hours, to respond better to a short-term grid event or price change. For example, the system may detect price volatility above some threshold during a period that was blocked at least in part on the assumption that there would be minimal price volatility. In this case, the blocking could be dropped or changed, e.g., if the blocked period was supposed to last for three hours it might be re-separated into three one-hour control periods. If this would strain the processing capacity of the system, the increased processing resulting from adding two periods to the planning horizon could be compensated by shortening the planning horizon (e.g., from 24 hours to 12 hours) for the next two hours until the original three-hour block is over, or some more remote hours (e.g., hours 22-24 of the current 24-hour planning period) could be blocked temporarily, resulting in a temporary increase in emphasis on the nearer term horizon. Alternatively, it may be possible to mode block other non-temperature set point variables, e.g. outside air damper position associated with a DCV dynamic or HVAC system set points.

These techniques of adjusting the number of optimization variables to be considered over the planning horizon are hereinafter referred to as "building mode flexibility." This typically reduces the number of control signals, which leads to improved computational speed and also avoids local minima in the evaluation process.

With these enhancements, the inventors have provided an optimizer, which is i) well-suited to the multi-dimensional dynamic character of the optimization, e.g., there is processing power sufficient to permit simultaneous optimization of multiple building dynamics and performance tradeoffs, and ii) has the speed needed to continually adapt in grid time horizons. And this is possible with a building design program such as EnergyPlus, which is not designed for prediction speeds compatible with real time control of building operations.

In addition, both the on-line real-time and the off-line multi-month simulation can be distributed into parallel processors, again for speed and scalability. An off-line example would be speeding up the simulation of an historical cooling season by splitting the simulation into discrete months for parallel optimization and then stitching the monthly results back together in post-processing in a manner that captures the thermal transition from one month to the next.

An interesting advantage/use of the optimizer is that the optimizer is an excellent quality control tool because it identifies false opportunities made available by modeling shortcuts and mistakes. It is also noted that when a detailed building energy simulation model is used, the predictive optimization process relies on, but also informs and influences the development of a building description input file, which is created through an extensive, manual building audit and a more finely tuned auto-calibration process. For example, the building description input file is developed to enable the optimizer to more easily find and take advantage of part load conditions that are particularly important to predictive optimization. In fact, the extensive use of the predictive optimization algorithms has pointed toward better ways to model buildings in EnergyPlus. Each building's energy characteristics are unique.

Building/Grid Integration—

The industry is currently focused on traditional, less valuable surrogate markets borne out of traditional utility rate regulation: i) utility TOU rates (a grossly imperfect substitute for dynamic market prices and market price volatility), ii) efficiency at the meter (a grossly imperfect substitute for source efficiency), iii) monthly utility peak demand reduction (largely a revenue collection mechanism, not a grid economic opportunity).

According to the present invention, the short-term dynamic character of the large commercial office building can be mapped to the short-term dynamic character of electric grid operations—e.g. frequency control, regulation, load following, spinning reserve, and unit commitment. Based on that mapping, an on-line, automated, and scalable technology can be provided to engage large commercial office buildings in the dynamic grid operations and markets.

The development of these grid services forms a new and reliable supply-equivalent source in the urban core, where new generation assets cannot be built. This will have special value as carbon constraints become reality and old urban centers like Chicago have to dismantle large, old coal generation plants near the urban core. Similarly, this will have special value substituting for the extra grid operating reserves necessary to accommodate intermittent renewable energy.

The present invention addresses the largely untapped economics of building/grid integration, providing an opportunity to reduce the net economic cost of supplying large commercial office buildings by 20-40%.

For example, buildings can be economically dispatched against hourly and sub-hourly grid markets. Security-constrained economic dispatch of generating plants is the universally adopted protocol for maximizing grid economics (including energy and environmental). In such an arrangement, the least expensive generation capacity is used for the constant demand, and the reserve for satisfying increased demand is satisfied by higher cost generation that can be brought into play quickly. A grid operator may not have to have extra generating capacity available for all of the needed demand increase, if there are spinning reserves available around the grid to supply part of the demand increase. So one of the grid "markets" is a spinning reserve market where participants offer to supply spinning reserve. The optimization system of the invention can manage one or more large buildings in such a way as to play in this spinning reserve market. A demand increase that would call on the spinning reserve can be equally satisfied by a corresponding decrease in the demand of the building(s) being controlled by the optimization system of this invention. Thus, if the price the grid is willing to pay for spinning reserves to be maintained is high enough, it may be economical for the optimization system to control the building(s) so as to maintain a high level of charge on various "batteries", whatever incremental cost incurred by keeping this level of charge being outweighed by what the grid operator is willing to pay to have the spinning reserve available. Similarly, a load imbalance on the grid will have detrimental effects on the frequency on the power lines, so a grid operator seeks to constantly adjust supply to track demand fluctuations. Instead of increasing supply to match demand increase, frequency regulation objectives could be met by decreasing demand, e.g., when the grid sees a slight increase in demand it could (by simply sending a signal to the optimization system of this invention) direct a demand reduction to match.

Thus, the present invention enables large commercial office buildings to participate in the dispatch of the building's energy "supply" resources against grid markets. In the case of either generating plants or buildings, the associated energy contracts need not interfere with economic dispatch. Instead, contracts serve ancillary budgeting, financing (collateral), and financial risk management objectives.

In addition to i) competing with generating plants to provide grid operating reserves; as discussed above, the present invention also allows ii) providing storage to support intermittent solar/wind resources and to absorb surplus night-time wind energy; iii) providing demand elasticity to accomplish the market/regulatory objective of mitigating shortage pricing (most prevalent in large, grid-congested cities); iv) deferring the need for capital improvements to expensive underground transmission and distribution systems (again, in large grid-congested cities); v) possibly displacing the least efficient, most polluting plant in unit commitment every day; vi) allowing cheaper, faster build-out of electric systems serving emerging megacities, etc.

The most significant opportunity for building/grid integration occurs in large metropolitan areas for at least the following reasons.

First, environmental constraints preclude local electric generation.

Second, imported electricity congests the grid and triggers high and volatile electric prices. A large portfolio of commercial office buildings comprises a significant portion of the electric demand at an LMP (locational marginal price) node and so can exert significant downward price pressure.

Third, demand growth portends expensive improvements to underground electric distribution. A large portfolio of commercial buildings—able to shift demand out of summer peak hours—can have a significant influence on the need for upgrading the expensive underground transmission and distribution systems that characterize large cities.

Finally, large numbers of office buildings are concentrated and can be coordinated for dynamic effect. Moreover, because of their size, sophistication, and location, commercial office buildings provide a flagship, big impact application on any Smart Grid serving a metropolitan area.

"Free" thermal mass, on the multi-MW scale that already exists in large metropolitan areas, creates a national opportunity for:

Continuous demand elasticity—competing and dispatching against electric generation to moderate market prices (and price volatility) and reduce peak demand by creating price elasticity in large commercial office building electric demand that is continuous, dispatchable, and scalable.

Untapped source and end-use efficiency—optimally timing the cooling and discharge of a building's thermal mass i) to create generating unit commitment and dispatch economies; ii) to displace inefficient marginal generators in grid ancillary services markets; and iii) to improve the economics and penetration of high efficiency systems within buildings for the benefit of electric system source efficiency.

Reduction of power plant emissions (carbon, $NO_x$, $SO_2$, and particulate emissions)—similarly timing the cooling and discharge of a building's thermal mass to also effect more rational and efficient day and night-time loading of generating plants for significant environmental benefit.

Additional Advantages

Financial Risk Management—

Figure 11:
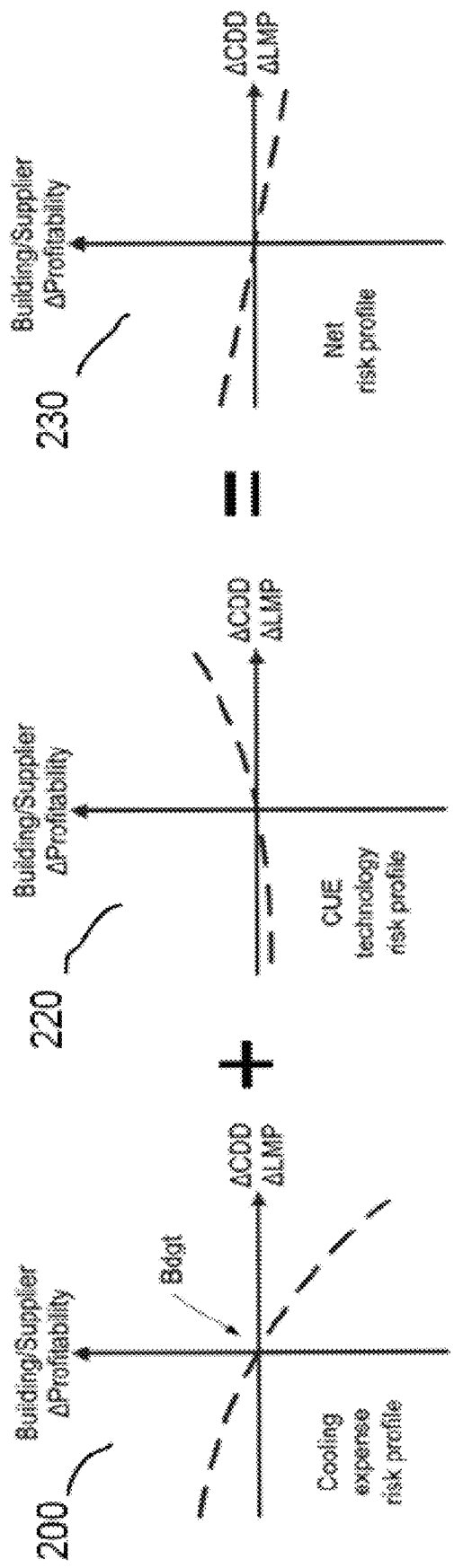
FIG. 11 is a graphical explanation of the risk management capability of the system according to the invention.

Since use of the optimization system according to the invention becomes more profitable as energy prices increase, deploying the optimization system can address financial risk management concerns. With reference to FIG. 11, Graph 200 shows that as energy prices increase, building profitability decreases. Graph 220 shows that as energy prices increase, the use of the optimization system according to the present invention becomes more profitable for a building. Graph 230 then shows that the combined effects still have building profitability decreasing with increasing energy prices, but the decrease is much slower and the odds of a significant financial loss are greatly diminished.

SaaS—

An additional advantage of the invention is that it presents an energy storage solution that can be provided in the form of SaaS (Software as a Service). This presents a very significant cost/lead-time/space advantage over traditional energy storage solutions. This advantage is greatest in large grid-congested cities where traditional storage has greatest value but cannot be sited.

Optimizer as a Teaching Tool—

A yet further advantage of the invention is that, when used to simulate historical cooling seasons off-line, the optimizer accelerates the discovery and development process. Environmental information/data from virtually any time period or city where records were kept could be supplied as inputs to the model, and different control programs could be compared (e.g., a typical or traditional strategy vs. an optimized control strategy according to the invention) to identify opportunities for savings or other improvement, and also to better understand the dynamics going forward. For example, the optimizer, whether used on-line or off-line, finds non-obvious building model shortcomings and non-obvious building control strategies, e.g. as a result of part-load performance characteristics. The optimizer further can reveal non-obvious temperature set point and DCV strategies that take best advantage of such curves. As still another example, the optimizer can reveal the importance of adopting modeling protocols that unbundle selected HVAC system components, consistent with the discretized operation under the part-load conditions that occur during early morning precooling operations vs. the high fixed loads that prevail during high cooling load occupancy hours.

Portfolio Application—

The application of the invention to a portfolio of buildings provides aggregate benefits exceeding individual building benefits. A city-wide building portfolio in a congested metropolitan area has the multi-MW scale to compete and dispatch against urban supplies.

Similarly, the thermal mass of already existing buildings is a large, less costly, and broadly available alternative to currently available energy storage for wind energy generation. Building thermal mass in cities can effectively substitute for the added grid operating reserves needed for intermittent renewables and as storage for night-time wind energy. In a crowded, grid-constrained market such as a big city, reserves of 50 MW to 100 MW are desirable, and the need to even greater reserves such as 300 MW is foreseeable. Building that kind of capacity could cost on the order of $1,000 per kW, and could easily take a decade of planning, permitting and construction. On the other hand, the effective grid-scale storage realized by the present invention can be implemented for $20/kW to $50/kW and can be done with about a one month lead time, with no long term planning, permitting or construction. In addition to capital cost considerations, generating plants are commonly evaluated with regard to electric efficiency, cycles before failure, flexibility, and duration of the available supply. The effective reserves made available by the present invention, in addition to being cheaper and faster to implement, are characterized by high round trip storage efficiency, can supply reserves for several hours, which is far beyond the duration of any scarcity pricing episode to be dealt with, infinite cycles with no performance degradation, and can be brought on line hourly, intra-hourly or even intra-minute.

In the Midwestern United States as elsewhere, electric demand is higher during the day than at night. Unique to the Midwestern United States, the additional daytime "peak" electricity is provided from smaller, less efficient coal-fired plants. The present invention can optimally shift daytime electric use from day to the night—to more efficient coal-fired plants, equipped with better environmental technology. This reliance on coal-fired plants for daytime peaking electricity also creates significant inefficiencies in the electric grid at night, including degraded plant environmental performance and negative electric market prices. Application of this invention systematically improves electric grid efficiency and environmental performance, both day and night—especially valuable in large, grid-constrained metropolitan areas.

From a smart grid perspective, the invention harnesses the inherent physical and operating flexibility of commercial buildings to create value for, and provide services to, the electric grid very quickly and at low cost.

The Jun. 16, 2008 electric prices shown in FIG. 1 provide a dramatic example of the very low and often negative nighttime prices that characterize midwestern energy markets—a significant pre-cooling opportunity in an era of otherwise volatile daytime energy prices.

The invention has been described herein mostly in the context of cooling loads and electricity grid operations in the summer season, but as described earlier the system operates as well to efficiently shape heating loads and optimize building HVAC system operation in response to electric and/or carbon (e.g., natural gas) market prices.

The present invention transfers thermal mass research to practice in the complex office buildings that dominate large metropolitan areas. In its simplest application, the invention can achieve significant reduction in energy consumption, energy expense and peak demand.

The invention can be applied to any existing building, whether one or forty years old, with minimal capital investment and no space requirement.

In addition, the concept of dynamically controlling load to coordinate with energy generation through grid markets can be applied in a more direct manner to smaller scale energy generation facilities, e.g., universities, military bases, or other campuses having their own power generation and/or storage facilities, a configuration commonly referred to as a "micro-grid." In such a case, the system of the invention cannot only control load to match generation, but can control both energy consumption and energy generation. By way of example, the campus or other facility may have multiple different energy generation sources such as photovoltaic, wind generation, on-site electric generating capacity, electric grid availability, etc., some form of energy storage, and both the energy generating operations and building operations may have one or more constraints, and the optimization system of this invention can take all of these facts into consideration in arriving at an overall optimized control plan.

While the invention has been described above by way of specific examples, it will be understood that various changes and modifications may be made to the specific examples without departing from the scope of the invention as defined in the claims which follow.

What is claimed is:

1. A method of controlling energy consumptive devices in at least one building, comprising the steps of
   generating a detailed building energy simulation model of said building;
   simulating operation of at least one said energy consumptive device in said building over a planning period in accordance with a plurality of control plans using said model to predict a behavior of said building, said planning period comprising a sequence of control periods, each control plan comprising a sequence of control steps each corresponding to one of said control periods, and said simulating step comprising simulating behavior of said building in each control period taking into account the behavior of said building resulting from the control step in a previous control period;
   based on results of said simulating step, determining a set of control signals which when provided to said building will be optimal according to a first criterion; and
   controlling operation of said at least one device by providing said set of control signals to said building.

2. A method according to claim 1, wherein said determining step comprises evaluating the behavior of said building associated with at least two of said plurality of control plans, and selecting a desired control plan in accordance with the results of said evaluation, and wherein said controlling step comprises generating said set of control signals and providing the generated set of control signals to said building.

3. A method according to claim 2, wherein said set of control signals comprises a sequence of control signals for controlling said operation of said device over a planning period, each control signal controlling operation of said device over a respective control period shorter than said planning period.

4. A method according to claim 3, wherein said simulating, evaluating and selecting steps are performed multiple times during each planning period.

5. A method according to claim 4, wherein said simulating, evaluating and selecting steps are repeated automatically.

6. A method according to claim 5, wherein said simulating, evaluating and selecting steps are performed on demand.

7. A method according to claim 5, wherein said simulating, evaluating and selecting steps are performed at least once during each hour.

8. A method according to claim 7, wherein said simulating, evaluating and selecting steps are performed in some instances on five minute intervals.

9. A method according to claim 7, wherein said building is a commercial building.

10. A method according to claim 2, wherein said step of generating said detailed building energy simulation model comprises generating said detailed building energy simulation model from a building energy simulation program for simulating building behavior with different building designs.

11. A method according to claim 2, wherein said selecting step comprises selecting a control plan which optimizes said behavior in accordance with at least one criterion.

12. A method according to claim 11, wherein said evaluating step comprises comparing predicted behaviors associated with plural control plans.

13. A method according to claim 2, wherein said evaluating step comprises evaluating the predicted behavior in accordance with at least two criteria.

14. A method according to claim 13, wherein said evaluating step comprises comparing predicted behaviors associated with each of said plural control plans.

15. A method according to claim 13, wherein said selecting step selects a desired control plan which optimizes said behavior in accordance with said one criterion subject to a constraint related to another criterion.

16. A method according to claim 2, wherein said step of controlling operation comprises controlling energy consumption and energy generation in said building.

17. A method according to claim 2, wherein said optimizing step considers multiple different energy sources.

18. A method according to claim 2, wherein said method further comprises simultaneously performing the method of claim 2 with respect to multiple buildings.

19. A method according to claim 2, wherein said building is a commercial building.

20. A method according to claim 2, wherein said step of generating said detailed building energy simulation model comprises generating said model from one of a plurality of building energy simulation programs, and wherein:
said simulating step comprises providing an optimizer having an interface compatible with each of said plurality of building energy simulation programs, and operating said model and optimizer together to simulate operation of said at least one device, and
said evaluating step is performed by said optimizer.

21. A method according to claim 20, wherein each of said building energy simulation programs is a program for simulating building behavior with different building designs.

22. A method according to claim 2, wherein said predicted behavior of said building includes plural building dynamics.

23. A method according to claim 22, wherein one of said plural building dynamics is chilled water storage.

24. A method according to claim 22, wherein one of said plural building dynamics is fresh air storage.

25. A method according to claim 22, wherein one of said plural building dynamics is thermal mass storage.

26. A method according to claim 22, wherein each of said plural building dynamics is a building energy system part-load characteristic.

27. A method according to claim 22, wherein said selecting step comprises selecting a control plan which optimizes at least one criterion.

28. A method according to claim 27, wherein said evaluating step comprises comparing predicted behaviors associated with plural control plans.

29. A method according to claim 27, wherein said selecting step comprises selecting a control plan which optimizes said behavior simultaneously according to plural criteria.

30. A method according to claim 29, wherein said plural criteria include at least two of $CO_2$ concentration, energy cost, energy consumption, and chiller starts.

31. A method according to claim 29, wherein said plural criteria include at least one grid market opportunity.

32. A method according to claim 31, wherein said at least one grid market opportunity comprises spinning reserve.

33. A method according to claim 31, wherein said at least one grid market opportunity comprises load balancing.

34. A method according to claim 27, wherein said selecting step comprises selecting a control plan which optimizes according to said one criterion subject to a constraint imposed on at least one other criterion.

35. A method according to claim 22, wherein said plural building dynamics include at least two of thermal energy storage, fresh air storage, and chilled water storage.

36. A method according to claim 35, wherein one of said plural building dynamics is chilled water storage.

37. A method according to claim 22, wherein each said control plan comprises a sequence of control signal sets for controlling said operation of said device over a planning period, each control signal set controlling operation of said device over a respective control period shorter than said planning period.

38. A method according to claim 37, wherein said simulating, evaluating and selecting steps are repeated multiple times during each planning period.

39. A method according to claim 38, wherein said simulating, evaluating and selecting steps are repeated at least once during each hour.

40. A method according to claim 22, wherein said method further comprises simultaneously performing the method of claim 22 with respect to plural buildings.

41. A method according to claim 2, wherein said building is connected to an energy supply grid and said predicted behavior of said building includes at least one behavior resulting from providing at least one service to said grid.

42. A method according to claim 41, wherein said service is spinning reserve.

43. A method according to claim 41, wherein said service is load balancing.

44. A method according to claim 41, wherein said service is frequency regulation.

45. A method according to claim 41, wherein said selecting step comprises selecting a control plan which optimizes at least one evaluation criterion.

46. A method according to claim 41, wherein said evaluating step comprises comparing predicted building behavior associated with plural control plans.

47. A method according to claim 41, wherein said evaluating step comprises evaluating the predicted behavior of said building associated with each of said at least two control plans, and comparing evaluation results associated with said control plans.

48. A method according to claim 41, wherein said selecting step selects a desired control plan which optimizes at least one evaluation criterion subject to a constraint imposed on a second evaluation criterion.

49. A method according to claim 41, wherein said selecting step selects a desired control plan which optimizes at least two evaluation criteria.

50. A method according to claim 41, wherein each said control plan comprises a sequence of control signal sets for controlling said operation of said device over a planning period, each control signal set controlling operation of said device over a respective control period shorter than said planning period.

51. A method according to claim 50, wherein said simulating, evaluating and selecting steps are repeated multiple times during each planning period.

52. A method according to claim 51, wherein said simulating, evaluating and selecting steps are repeated at least once during each hour.

53. A method according to claim 41, wherein said method further comprises simultaneously performing the method of claim 2 with respect to plural buildings.

54. A method according to claim 1, wherein said step of generating said detailed building energy simulation model comprises generating said detailed building energy simulation model from a building energy simulation program for simulating building behavior with different building designs.

55. A method of controlling at least one energy consumptive device in at least one building, comprising the steps of:
predicting a behavior of the building; and
controlling the at least one energy consumptive device to optimize said predicted behavior to serve at least two objectives, said controlling step comprising generating a set of control signals based on the predicted behavior and providing said set of control signals to said building, wherein said controlling step comprises controlling said energy consumptive device over a control period of time subsequent to the generation of said set of control signals, and at least some of said control signals in said set control said energy consumptive device at different times during said control period.

* * * * *